United States Patent Office 3,592,825
Patented July 13, 1971

3,592,825
p-DIOXENE SYNTHESIS
Thomas C. Snapp and Alden E. Blood, Longview, Tex., assignors to Eastman Kodak Company, Rochester, N.Y.
No Drawing. Filed Dec. 26, 1968, Ser. No. 787,205
Int. Cl. C07d 15/12
U.S. Cl. 260—340.6
14 Claims

ABSTRACT OF THE DISCLOSURE 2,3-dihydro-p-dioxin (p-dioxene) is prepared by a process which comprises contacting a mixture of hydrogen, water and diethylene glycol in the vapor phase at elevated temperature over a catalyst comprising copper, silver, nickel, chromium, palladium, platinum or mixtures thereof impregnated on a silica gel support containing at least 99 weight percent silicon dioxide and having a surface area in excess of 500 square meters/gram. p-Dioxene is a valuable intermediate in the preparation of polymers useful, for example, as viscosity improvers for motor oils, and in oxonation and epoxidation reactions to yield cyclic aldehydes and alcohols which are useful, for example, as plasticizers, surface active agents and adhesives.

---

This invention relates to the synthesis of 2,3-dihydro-p-dioxin, hereinafter referred to as p-dioxene. More particularly, it is concerned with a novel and improved catalytic process for preparing p-dioxene from diethylene glycol.

The cyclic vinyl ether, p-dioxene, is a well-known and valuable article of commerce. For example, the compound is a useful solvent, per se, as well as a valuable intermediate in the preparation of polymers, e.g., urethane applications, and viscosity improvers for motor oils, and in oxonation and epoxidation reactions to yield cyclic aldehydes and alcohols which have applications as plasticizers, surface active agents and adhesive formulations.

p-Dioxene has previously been prepared in low yields by the reaction of 2,3-dichloro-1,4-dioxane with Grignard reagents such as methyl, ethyl or 1-butyl magnesium bromide, and by the reaction of 2,3-dichloro-1,4-dioxane with magnesium iodide. It has been prepared in low yields by the catalytic vapor-phase dehydrogenation-dehydration of ethylene glycol and in small amounts as a by-product from the copper chromite-catalyzed dehydrogenation of diethylene glycol. p-Dioxene has also been prepared by the liquid-phase dehydrogenation-dehydration of diethylene glycol over certain catalysts, e.g., copper chromite and copper. Using a copper chromite catalyst in admixture with potassium acid sulfate, the liquid-phase reaction is said to result in conversion to p-dioxene on the order of 35–45%, whereas metallic copper in admixture with potassium acid sulfate results in a reported yield of less than 25 percent. However, when the potassium acid sulfate is omitted, the major product formed in the liquid-phase reaction is 2-p-dioxanone, e.g., the use of copper chromite per se results in a yield to p-dioxene on the order of 2 percent, and copper chromite in admixture with 2 percent $Cr_2O_3$ on silica gel gives a yield to p-dioxene on the order of 15 percent. While the liquid-phase reaction provides improved yields in comparison to other known methods of preparing p-dioxene, it has certain disadvantages, such as slow reaction rates and an undesirable decline in catalyst life and activity, which do not appear to be present in vapor-phase reactions.

In accordance with the present invention, there is provided a novel process for the synthesis of p-dioxene by the simultaneous dehydrogenation and dehydration in the vapor phase of diethylene glycol at elevated temperatures in a hydrogen atmosphere. Since diethylene glycol is a low cost, commercially available material, the process of the instant invention provides a convenient and economical method of preparing p-dioxene. The preparation of p-dioxene can be illustrated by the following equation:

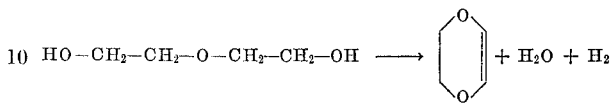

$$HO-CH_2-CH_2-O-CH_2-CH_2-OH \longrightarrow \text{(dioxene)} + H_2O + H_2$$

The simultaneous dehydrogenation and dehydration of diethylene glycol to p-dioxene according to the process of this invention is effected by passing vapors of diethylene glycol in admixture with water and hydrogen over a particular catalyst. The reaction can be conveniently effected in a fixed bed or fluidized bed reactor. The contact time will vary with the temperature but is usually from 0.5 to 30 seconds, preferably from 8–12 seconds. "Contact time" is defined as the period of time that a unit volume of reacting gas is in the catalyst zone under the conditions of the reaction. The effluent reaction products can be treated to separate the desired product by any suitable means, such as by fractional distillation.

It is a particular feature of this invention that high conversion and yields to p-dioxene based on diethylene glycol are obtained while at the same time catalyst life is increased and the activity of the catalyst is maintained at high levels.

The present invention involves a process wherein an excess of hydrogen together with water and diethylene glycol are admixed and passed in the vapor phase over a novel catalyst system, thereby resulting in the selective conversion of diethylene glycol to p-dioxene in high conversions and yields.

As noted, a particular feature of the present invention is the use of a novel catalyst which permits the production, in the vapor phase, of p-dioxene from diethylene glycol. The novel catalyst of this invention is prepared by the impregnation on a particular silica gel support of metals known to promote dehydrogenation. Metals such as copper, silver, nickel, chromium, palladium, platinum or mixtures thereof are particularly effective in the process of this invention. It is possible to obtain commercial yields of p-dioxene through the use of from 1–25 weight percent, based on total catalyst weight, of the metal catalyst. Preferably the support should have impregnated thereon from 3–20 weight percent of metal catalyst and excellent results are obtained using from 9–12 weight percent of metal catalyst.

It has been found that the support utilized for the catalyst is critical. The support of our invention comprises a silica gel of extremely high purity containing more than 99 percent silicon dioxide and having a surface area greater than 500 square meters per gram. High purity silica gels having a surface area of 500–1000 square meters per gram have been found to be effective. Preferably, the silica gel will have a surface area of 600–900 square meters per gram, and even more preferably of 650–850 square meters per gram.

The novel catalyst of the invention can be prepared by a process comprising: (1) impregnating a soluble salt of the metal, such as the metal nitrate, onto the high purity, high surface area silica gel support; (2) thermally decomposing the metal salt to the corresponding metal oxide; and (3) reducing the metal oxide with hydrogen to obtain the metal impregnated silica gel catalyst of the invention. Any soluble metal salt of copper, silver, nickel, chromium, palladium, platinum or mixtures thereof which can be decomposed to the corresponding oxide can be used in preparing the catalysts of the invention. Illustrative of such salts are the soluble nitrates, acetates, halides and sulfates, of the mentioned metals; the soluble organic and inorganic salts of copper, silver, nickel, chromium or their mixtures, including the nitrates, acetates, halides and sulfates, etc., see, for example, the solubility tables of "Handbook of Chemistry and Physics," Chemical Rubber Publishing Co., Cleveland, Ohio, 34th ed. (1952). The inorganic nitrate salts are preferred. The essential ingredients of our catalyst are thus one or more of the named metals impregnated on a high purity, high surface area silica gel.

The simultaneous dehydrogenation and dehydration of diethylene glycol to p-dioxene according to the process of the invention can be effected at temperatures such that the hydrogen, water and diethylene glycol are maintained in the vapor phase, for example, from about 230° C. to about 450° C. Excellent results have been obtained at temperatures of 275-350° C., particularly 300°-350° C. Best results are obtained by separately heating the hydrogen and a mixture of diethylene glycol and water to the desired reaction temperature and admixing the two streams prior to introducing the vaporized reaction mixture into the catalyst zone.

Generally, a pressure below atmospheric is employed in effecting the simultaneous dehydrogenation and dehydration of diethylene glycol to p-dioxene according to the process of the invention. However, pressure both above and below atmospheric, for example, pressures ranging from as low as 100 mm. Hg to as high as 100 p.s.i., can also be employed.

A further feature of the present invention is that the water must be present in the vaporized feed stream to the reaction zone. Good results can be obtained with mole ratios of water:diethylene glycol between 0.2:1 and 6:1. Preferably the ratio is between 0.5:1 and 3:1, and particularly good results are obtained when the ratio is between 0.5:1 and 2:1.

It is an additional feature of the instant invention that diethylene glycol is simultaneously dehydrogenated and dehydrated to p-dioxene in the presence of both water and hydrogen. This effect is unexpected since the reaction mechanism would indicate that the presence of water and hydrogen in the reaction system would tend to depress the conversion of diethylene glycol to p-dioxene. The effect of using an excess of hydrogen is even more unexpected since one would predict the added hydrogen would enhance the hydrogenation of p-dioxene to p-dioxane in the presence of our catalyst system which contains metals capable of catalyzing hydrogenations as well as dehydrogenations. The use of both water and excess hydrogen appears to enhance rather than inhibit the conversion of diethylene glycol to p-dioxene. Accordingly, there is employed in the practice of our invention an excess of hydrogen in admixture with the diethylene glycol and water. A mole ratio of hydrogen:water:diethylene glycol in the range of 1.5:6:1 to 12:0.2:1 can be used in the practice of our invention. Preferably the ratio is in the range of 2:3:1 to 10:0.5:1, with a particularly preferred ratio being between 3:0.5:1 and 3:2:1.

The following examples are set forth for purposes of illustration, and it should be understood that they are not to be construed as limiting the invention in any manner.

EXAMPLE 1

Preparation of catalyst

A solution of 116.2 grams of copper nitrate trihydrate in 700 ml. of distilled water is added to 305 grams of silica gel possessing a surface area of 800 square meters per gram. After 48 hours the water is evaporated by heating on a steam bath. The resulting copper nitrate on silica gel is heated at 350-400 C. in air for 8 hours. The resulting copper oxide impregnated silica gel (black color) is reduced by hydrogen at 350°-400° C. to give a 10 weight percent copper metal on silica gel catalyst.

EXAMPLE 2

Hydrogen and a diethylene glycol-water mixture are preheated separately to a temperature of 300°-350° C. The two streams are combined to provide a mole ratio of hydrogen:water:diethylene glycol of 3:1:1 and the tricomponent vaporized mixture is introduced into the catalyst zone which is maintained at a temperature of 300°-350° C. The catalyst zone is a fixed bed reactor packed with a catalyst prepared according to the procedure of Example 1 and comprising 10 weight percent copper impregnated on high purity silica gel having a surface area of 650 square meters per gram. Analysis of the reactor condensate indicates a conversion of 60 percent, based on diethylene glycol, to p-dioxene.

EXAMPLE 3

Following the procedure of Example 2, a gaseous mixture of hydrogen, water and diethylene glycol in a 3:1:1 mole ratio, respectively, is passed over a fixed bed catalyst prepared according to the procedure of Example 1 and comprising 10 weight percent copper impregnated on high purity silica gel having a surface area of 800 square meters per gram at a contact time of 10 seconds. Analysis of the reactor condensate indicates a conversion, based on diethylene glycol, of 75 percent to p-dioxene.

EXAMPLE 4

Following the procedure of Example 2, a gaseous mixture of hydrogen, water and diethylene glycol in a 3:1:1 mole ratio, respectively, is passed over a fixed bed catalyst prepared according to the procedure of Example 1 and comprising 10 weight percent silver impregnated on high purity silica gel having a surface area of 650 square meters per gram at a temperature of 340° C. and a contact time of 10 seconds. Analysis of the reaction condensate indicates a conversion to p-dioxene of 65 percent, based on diethylene glycol.

EXAMPLE 5

To illustrate the criticality of using a support having a large surface area, a gaseous mixture of hydrogen, water and diethylene glycol in 3:1:1 mole ratio, respectively, is passed, following the procedure of Example 2, over a fixed bed catalyst comprising 10 weight percent copper impregnated on high purity silica gel having a surface area of 360 square meters per gram and prepared according to the procedure of Example 1 at 325° C. and a contact time of 10 seconds. Analysis of the reactor condensate indicates a conversion to p-dioxene of 5 percent, based on diethylene glycol.

Although the invention has been described in detail with particular reference to preferred embodiments thereof, it will be understood that variations and modifications can be effected within the spirit and scope of the invention as described hereinabove.

We claim:

1. A process for producing p-dioxene which comprises contacting a mixture of hydrogen, water and diethylene glycol in a mole ratio ranging from 1.5:6:1 to 12:0.2:1, respectively, in the vapor phase at a temperature of about 230° C. to about 450° C. over a catalyst selected from the group consisting of copper, silver, nickel, chromium, palladium and platinum impregnated on a silica gel containing at least 99 percent silicon dioxide and having a surface area greater than 500 square meters per gram.

2. A process according to claim 1 wherein said mole ratio is from 2:3:1 to 10:0.5:1.

3. A process according to claim 2 wherein said mole ratio is from 3:0.5:1 to 3:2:1.

4. A process according to claim 1 wherein said catalyst comprises 1 to 25 weight percent copper, silver, nickel, chromium, palladium, and platinum.

5. A process according to claim 4 wherein said catalyst comprises from 3 to 20 weight percent of said metal.

6. A process according to claim 5 wherein said catalyst comprises 9 to 12 weight percent of said metal.

7. A process according to claim 1 wherein said silica gel has a surface area of 500–1000 square meters per gram.

8. A process according to claim 7 wherein said silica gel has a surface area of 600–900 square meters per gram.

9. A process according to claim 1 which comprises contacting a mixture of hydrogen, water and diethyleneglycol in a molar ratio ranging between 2:3:1 and 10:0.5:1, respectively, in the vapor phase at a temperature of 275° C. to 350° C. over a catalyst comprising 3 to 20 weight percent of a metal selected from the group consisting of copper, silver, nickel, chromium, palladium and platinum impregnated on a silica gel containing at least 99 percent silicon dioxide and having a surface area of 500 to 1000 square meters per gram.

10. A process according to claim 9 wherein said catalyst comprises 9 to 12 percent of said metal, said silica gel has a surface area of 600 to 900 square meters per gram and said temperature of 300° C. to 350° C.

11. A process according to claim 10 wherein said catalyst comprises 10 weight percent copper, or silver.

12. A process according to claim 1 which comprises contacting a mixture of hydrogen, water and diethylene glycol in a molar ratio of 3:0.5:1 and 3:2:1, respectively, in the vapor phase at a temperature of 275° C. to 350° C. over a catalyst comprising 3 to 20 weight percent of a metal selected from the group consisting of copper, silver, nickel, chromium, palladium and platinum impregnated on a silica gel containing at least 99 percent silicon dioxide and having a surface area of 500 to 1000 square meters per gram.

13. A process according to claim 12 wherein said catalyst comprises 9 to 12 weight percent of said metal, said silica gel has a surface area of 600 to 900 square meters per gram and said temperature is 300° C. to 350° C.

14. A process according to claim 13 wherein said catalyst comprises copper, or silver.

References Cited

UNITED STATES PATENTS

| | | | |
|---|---|---|---|
| 2,142,033 | 12/1938 | McNamee et al. | 260—340.6 |
| 2,807,629 | 9/1957 | Bell | 260—340.6 |
| 3,399,215 | 8/1968 | Brader et al. | 260—340.6 |

OTHER REFERENCES

Summerbell et al., "Journ. Amer. Chem. Soc.," vol. 58 (1936), pp. 759–61.

Summerbell et al., "Journ. Org. Chem.," vol. 27 (1962), pp. 4,433–36.

ALEX MAZEL, Primary Examiner

J. H. TURNIPSEED, Assistant Examiner

U.S. Cl. X.R.

252—449, 458, 459, 460, 465